July 5, 1955  H. T. HALLOWELL ET AL  2,712,452
FACTORY TRUCK CONSTRUCTION
Filed Aug. 13, 1951  3 Sheets-Sheet 3
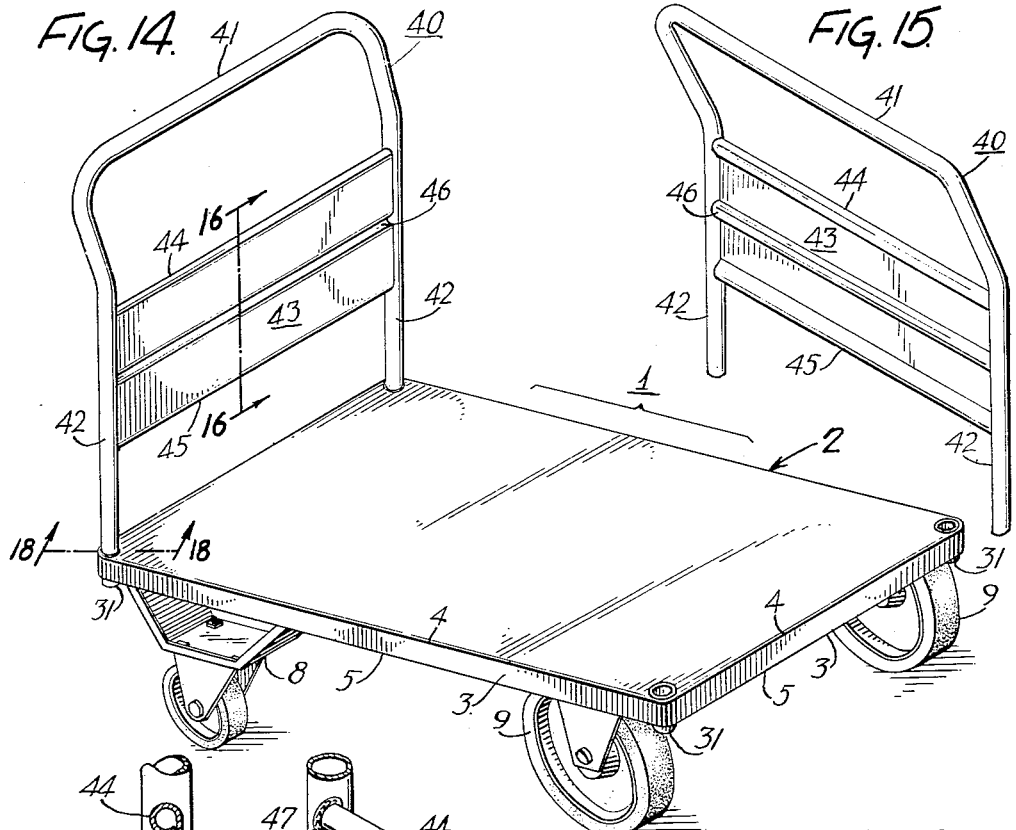
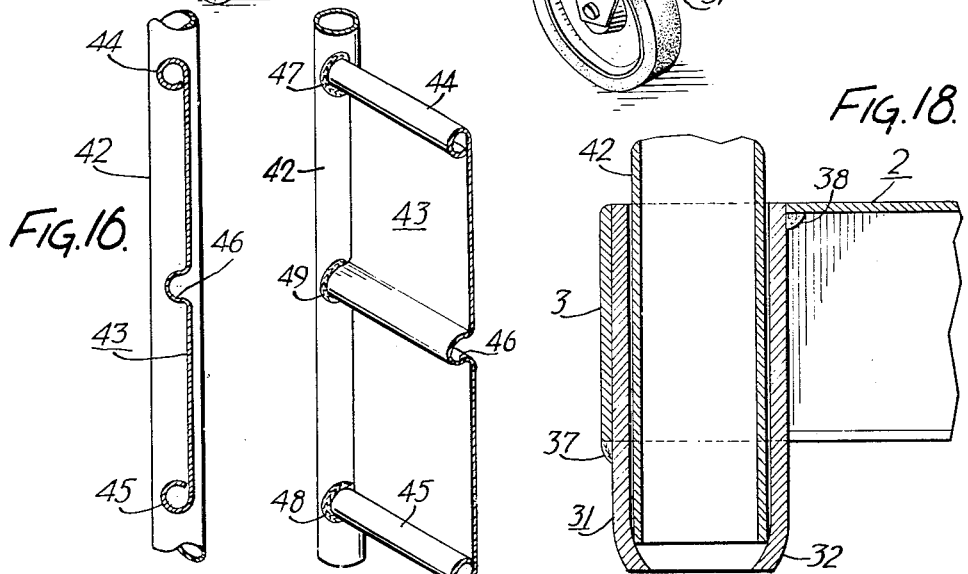
Inventors:
Howard T. Hallowell
Frank Bennett
by their Attorneys
Howson & Howson

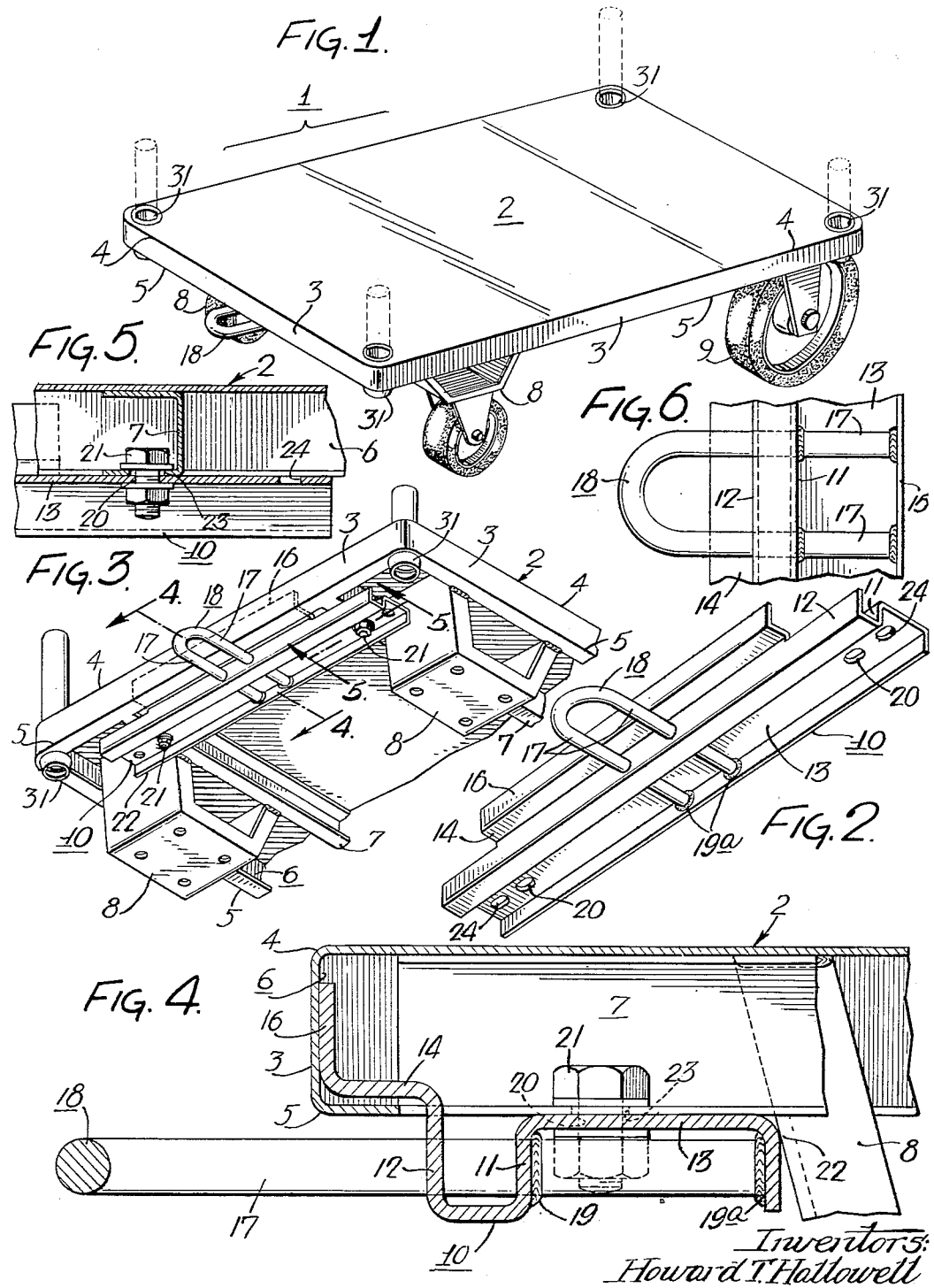

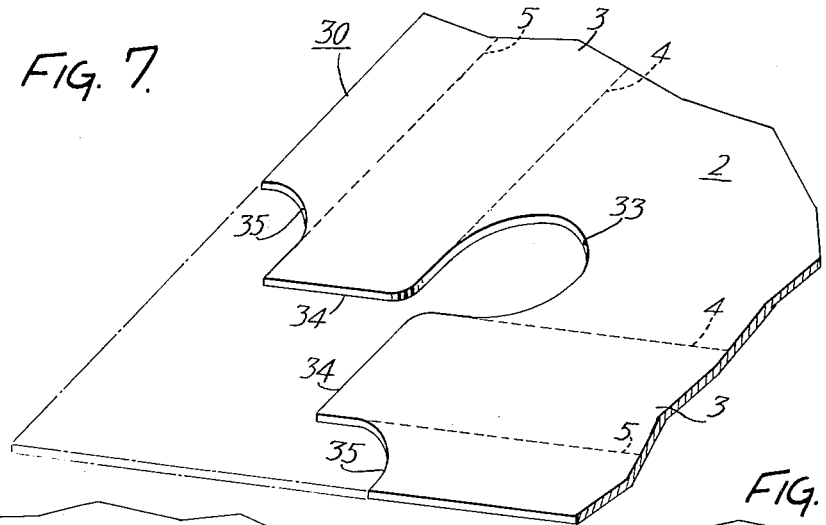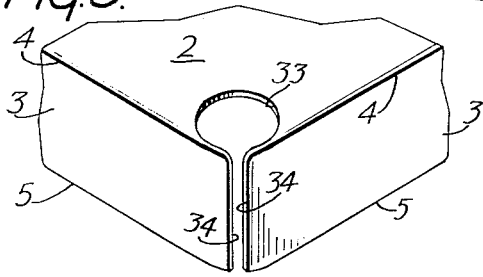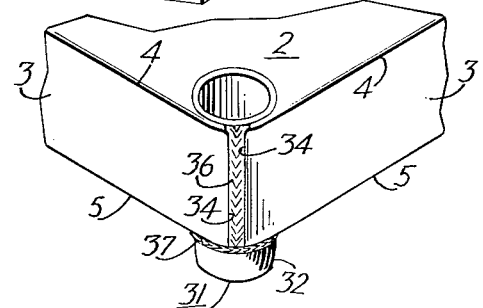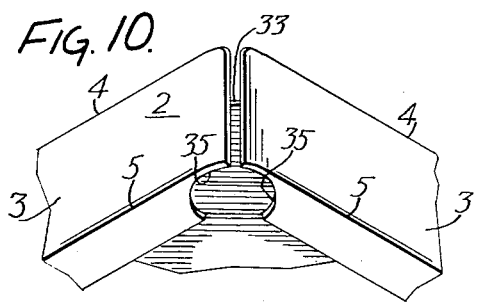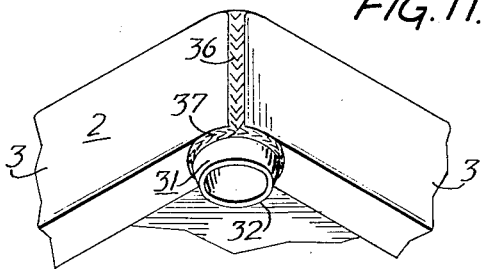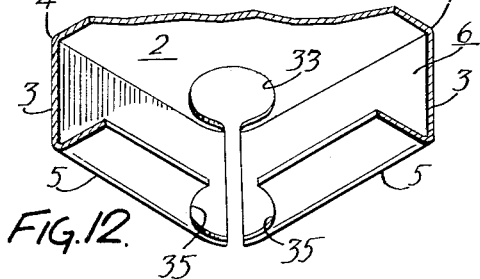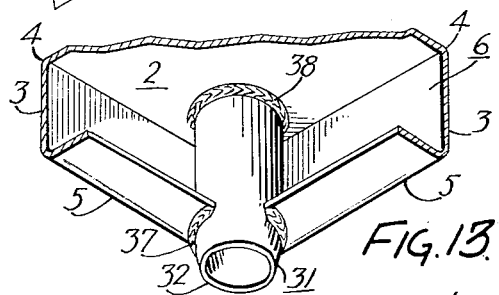

United States Patent Office 2,712,452
Patented July 5, 1955

2,712,452

FACTORY TRUCK CONSTRUCTION

Howard T. Hallowell, Jenkintown, and Frank Bennett, Philadelphia, Pa., assignors to Standard Pressed Steel Co., Jenkintown, Pa., a corporation of Pennsylvania Application August 13, 1951, Serial No. 241,638

5 Claims. (Cl. 280—79.1)

This invention relates to improvements in factory trucks.

One object of the invention is to provide a simple, readily mountable and demountable hitch assembly for a truck of the stated class.

A further object is to provide a demountable hitch assembly wherein provision is made for distributing the strains imposed by use of the hitch over a relatively large area of the truck structure, thereby reducing stress concentration.

Another object of the invention is to provide a demountable end rack for factory trucks, said rack being rigidly constructed but of relatively simple form.

Another object is to provide an end rack of convenient form and superior functional characteristics.

Still another object of the invention is to provide a novel socket device for the end rack, said means being an integral component of the corner structure of the factory truck.

A still further object is to provide a factory truck relatively simple in structure, adaptable for use both in hand operation and as a trailer with tractors or motor-driven trucks.

The invention resides also in certain novel structural details hereinafter described and illustrated in the attached drawings, wherein:

Fig. 1 is a view in perspective of a factory truck according to our invention in which the end rack is supplanted by corner stakes indicated in broken lines;

Fig. 2 is an enlarged perspective view of the hitch assembly;

Fig. 3 is an enlarged fragmentary perspective view of the underside of a factory truck including a hitch assembly according to our invention;

Fig. 4 is an enlarged sectional view on the line 4—4, Fig. 3;

Fig. 5 is an enlarged sectional view on the line 5—5, Fig. 3;

Fig. 6 is an enlarged fragmentary plan view of a hitch assembly according to our invention;

Fig. 7 is an enlarged view of a corner of a sheet metal blank used in the production of a factory truck according to the present invention;

Fig. 8 is an enlarged top perspective view of a corner of the factory truck in an intermediate stage of formation;

Fig. 9 is an enlarged top perspective view of the completed corner structure;

Fig. 10 is an enlarged bottom perspective view, looking inwardly, of the corner in an intermediate stage of formation;

Fig. 11 is an enlarged bottom perspective view of the completed corner;

Fig. 12 is an enlarged bottom perspective view, looking outwardly, of the corner in the intermediate stage of assembly;

Fig. 13 is an enlarged bottom perspective view, looking outwardly, of the corner completed;

Fig. 14 is a perspective view of a factory truck with a detachable end rack according to our invention;

Fig. 15 is a perspective view of the end rack;

Fig. 16 is an enlarged sectional view on the line 16—16, Fig. 14;

Fig. 17 is a fragmentary perspective view showing the structure of the end rack; and, Fig. 18 is an enlarged sectional view on the line 18—18, Fig. 14.

Referring to the drawings, and more particularly to Figs. 1 thru 6, reference numeral 1 represents generally a factory truck comprising a sheet metal body 2 which terminates at each edge in a flange 3 bent downwardly and inwardly at 4 and 5 respectively to form a channel 6 extending the full length of each side of the body 2; a pair of longitudinal reinforcing channels 7, 7 secured at the underside of the body 2 parallel to and spaced from the side edges and extending from one end of the body to the other; and wheel support structures 8, 8 and 9, 9 each inserted between and welded to one of the side flanges 3 and the proximate reinforcing channel 7. A hitch assembly or "drawbar" 10 is adapted to be releasably supported at the front end and at the underside of the body 2 between the channels 7, 7 as more fully described hereinafter.

The drawbar 10 is formed with a generally rectangular sheet metal blank, the blank being bent intermediate two opposite edges thereof to form an open-ended trough comprising upright sides 11 and 12. The sides 11 and 12 have outturned flanges, 13 and 14 respectively, the outturned flange 13 being bent downward again, as shown in Fig. 2, to form a vertical lip 15, and the flange 14 being bent upward to form a vertical lip 16, the purpose of these lips being set forth hereinafter. The sides 11 and 12 are perforated to provide passage for the arms 17, 17 of a U-shaped hitch bolt 18, the said arms being welded as indicated at 19 and 19a respectively to the side 11 and the lip 15. The flange 13 is apertured at 20, 20 for reception of bolts 21, 21 which secure the drawbar to the undersides of the channels 7, 7 as shown in Figs. 3, 4 and 5.

In the assembly, the flange 14 and lip 16 extends into the channel 6 at the front of the truck, as shown in Fig. 4, the said lip abutting the inner surface of flange 3. When thus positioned, the flange 13 engages the undersides of the reinforcing channels 7, 7, and the rearward sides of the ends of the drawbar abut the forward ends of the adjoining wheel support structures 8, 8 as shown at 22 in Figs. 3 and 4. The channels 7, 7 are apertured at 23, 23 to register with the apertures 20, 20 in the flange 13 of the drawbar, and the bolts 21, 21 pass through the sets of apertures 23, 20 and are secured by nuts to attach the drawbar rigidly to the truck.

It should be noted that the apertures 23, 23 are larger in diameter than the apertures 20, 20 so that when the drawbar 10 is attached to the truck 1, there will be substantially no horizontal forces exerted on the bolts 21, 21. This end is attained by abutment of lip 16 against the flange 3 and of the rear side of the drawbar against the wheel support structures 8, 8. Any forward thrust on the hitch bolt 18 will be transmitted to the truck 1 through lip 16 and flange 3. Similarly any rearward thrust on the hitch bolt 18 will be transmitted to the truck 1 through the flange 13 of the drawbar, and the wheel support assemblies 8, 8. It will be understood that the forward thrust is transmitted to the truck over the relatively large area of lip 16, and that the stress concentration is therefore small. Since the rearward thrusts are similarly divorced from the bolts 21, 21, horizontal shearing stresses in the bolts when the hitch assembly 10 is properly attached to the truck is reduced to a practical minimum.

The device also constitutes a desirable attachment for other factory trucks and may be purchased as an accessory and attached to trucks designed originally for hand operation. To this end, the flange 13 may be provided with a second set of perforations 24, 24 to register with perforations in the longitudinal reinforcing channels of a smaller size truck of similar construction to the truck 1. The relatively small transverse width of the flange 14 is for the purpose of permitting the flange and the lip 16 to be inserted between the relatively close channel members of the smaller truck in a manner similar to the above described method of assembly.

Figs. 7 to 13 illustrate a preferred method of forming the truck body described above. Reference numeral 30 designates a corner of a rectangular sheet metal blank to be used in the formation of the body 2, said corner being shaped, as more fully described hereinafter, to receive a preformed socket member 31. The member 31 comprises a length of tubular material which is drawn at one end 32 to an inside diameter smaller than that of the major portion of the tubular member.

The corner 30 is shaped so that when the flanges 3 of the adjoining sides are bent downwardly and inwardly at 4 and 5 respectively, the upper surface of the blank will exhibit a generally circular cutout or recess 33. The adjoining ends of the upright portions of flanges 3 form tabs 34, 34; and the segmental recesses 35, 35 of the inwardly directed lower edge portions of the flanges define circular cutouts at the underside of the body in alignment with and spaced from the cutout 33 at the top, as illustrated in Fig. 12. In completing the corner, the socket member 31 is seated in the cutouts 33 and 35, 35, see Fig. 13, so that the upper end of the socket member lies flush with the work surface of the body, the tabs 34, 34 are pressed inwardly so as to lie against the side of the socket member, and the member 31 is then secured in place by welding at 36, 37, and 38 as illustrated in Figs. 9, 11, and 13, the weld 36 also joining the confronting edges of the tabs 34, 34. The corner thus conforms in contour to the cylindrical form of the socket member 31. The weld 37 extends about the edges of the cutouts 35, 35 on the inwardly directed portions of the flange 3; and the weld 38 similarly extends about the periphery of the cutout 33 at the underside of the work surface of the truck body.

Welding of the corner in the above-described manner affords a smooth work surface at the top of the truck, the welds being confined to the underportions. The construction also affords great strength and rigidity at the several corners of the truck body, the tubular socket members assuming the added function of corner reinforcing elements and avoiding necessity for other and more complicated reinforcing structure. The great simplification effected by inclusion of the socket member in the corner structure by the method described above will be apparent.

Figs. 14 to 18 illustrate a novel form of an end rack for the truck. The rack comprises an inverted U-shaped tubular frame member 40, the upper portion 41 of said member being bent out of the plane of the frame to provide a hand grip for manual operation of the truck, and a sheet metal crosspiece 43, which extends between the legs 42, 42 of the frame as more fully described below. The legs 42, 42 are dimensioned for slidable engagement in the socket members 31, the lower extremity 32 of each socket member being drawn to a small diameter limiting the downward movement in the socket member of each of the legs 42 and to provide a firm seat for the end rack.

The crosspiece 43, which as stated extends between the legs 42, 42, see Figs. 14 and 15, is formed of sheet metal and has at its upper and lower edges tubular beads 44 and 45 of substantial diameter. Approximately midway between the edge beads 44 and 45 is a pressed out rib 46 which parallels the said edges and extends the complete width of the crosspiece. The crosspiece is welded to the legs 42, 42 at 47, 48 and 49, where the beads 44 and 45 and the groove 46 abut the legs.

This crosspiece 43 affords a structural rigidity in the end rack as great or greater than that afforded by the use of three separate crossbars, but is materially less expensive both as to material cost and cost of production and assembly. The tubular edges 44 and 45 and the longitudinal rib 46 provide a high degree of rigidity which is augmented by the presence of the sheet metal webs which integrally unite the said edges and rib. A further feature of the crosspiece is the relatively large flat area presented to the load material on the truck which facilitates the loading and retention during transit of the load material.

We claim:

1. A factory truck comprising a generally rectangular sheet metal body member having a work surface terminating in depending and inturned side and end peripheral flanges; a pair of longitudinal reinforcing elements arranged parallel to and spaced from said side flanges and rigidly affixed at the underside of said body member; wheel support structures affixed to and each supported between one of said side flanges and the adjoining longitudinal reinforcing elements; said body member having aligned openings at each corner in the work surface and in the inturned portions of the peripheral flanges respectively, a cylindrical member in each set of aligned openings and welded to the edges of the latter, said members forming reinforced corner structures for the truck body and constituting sockets for reception of detachable superstructure, and the end portions of each of the depending peripheral flanges being turned from their normal plane around the cylindrical surface of the proximate socket member and being welded to the side of said socket member and to the proximate end portions of the respective adjoining peripheral flanges whereby the corners of the truck body conform to the said cylindrical surfaces of the socket members.

2. A factory truck comprising a generally rectangular sheet metal body member having a work surface terminating in depending and inturned side and end peripheral flanges; a pair of longitudinal reinforcing elements arranged parallel to and spaced from said side flanges and rigidly affixed at the underside of said body member; wheel structures affixed to and each supported between one of said side flanges and the adjoining longitudinal reinforcing element; a self-contained hitch structure detachably secured to and supported by the reinforcing elements and bearing solidly against the inside of the depending flange at one end of the truck body, said hitch unit comprising a two-sided trough structure, one side of said structure having means for attachment of the unit to the said reinforcing elements, and the other side of said structure being formed for abutting engagement with the depending portion of the said end flange of the truck body, said unit including a hitch bolt extending beyond the said other side of the trough-like structure and below said front end flange of the truck body so that a forward thrust on the hitch bolt will be transmitted to the body of the truck through the said other side and the abutted portion of the front end flange.

3. A truck according to claim 2 wherein the first-named side of the said trough-like structure of the hitch unit is arranged to solidly abut the adjoining wheel support structures so that rearward thrust on the hitch bolt will be transmitted to the body of the truck through said first-named side and the abutted wheel support structures.

4. A truck according to claim 3 wherein the said hitch unit and the said reinforcing elements of the truck body are provided with mutually registering perforations adapted to receive retaining bolts for detachably securing the said unit to the truck body, at least one of the perforations of each registering pair being larger than the diameter of the bolt to avoid imposition of shearing strains on the bolts.

5. In a factory truck comprising a generally rectangular body member having depending peripheral side and end flanges and lengthwise reinforcing elements, a hitch assembly for attachment to one end of said body, said assembly consisting of a generally rectangular trough-like structure, a hitch bolt rigidly supported in said structure, one side of said structure being arranged for engagement with both said reinforcing elements, and another side being arranged to abut one of the said end flanges in pressure transmitting relationship thereto so that a forward horizontal thrust on said hitch assembly will be transmitted to the truck body by way of said other side and the abutted portion of said flange.

References Cited in the file of this patent

UNITED STATES PATENTS

| | | |
|---|---|---|
| 770,527 | Kelly | Sept. 20, 1904 |
| 1,221,997 | Koehler | Apr. 10, 1917 |
| 1,345,469 | Wood | July 6, 1920 |
| 1,425,596 | Kramer | Aug. 15, 1922 |
| 1,542,429 | Weber | June 16, 1925 |
| 1,723,085 | Sippel | Aug. 6, 1929 |
| 1,879,214 | Hallowell et al. | Sept. 27, 1932 |
| 1,907,910 | Wahlberg | May 9, 1933 |
| 1,908,783 | Pehrsson | May 16, 1933 |
| 1,992,710 | Matthaei | Feb. 26, 1935 |
| 2,414,277 | Shepard, Jr., et al. | Jan. 14, 1947 |